Sept. 22, 1970     I. RINKEWICH     3,529,618

IRRIGATION SYSTEM

Filed Sept. 30, 1968     3 Sheets-Sheet 1

INVENTOR.
ISAAC RINKEWICH
BY Berman & Berman
ATTORNEYS

Sept. 22, 1970   I. RINKEWICH   3,529,618
IRRIGATION SYSTEM
Filed Sept. 30, 1968   3 Sheets-Sheet 3

INVENTOR.
ISAAC RINKEWICH
Berman & Berman
ATTORNEYS 3,529,618
IRRIGATION SYSTEM
Isaac Rinkewich, New York, N.Y., assignor to Rinko Irrigation Systems, Inc., New York, N.Y., a corporation of Delaware
Continuation-in-part of application Ser. No. 744,781, July 15, 1968. This application Sept. 30, 1968, Ser. No. 766,671
Int. Cl. A01g 25/00
U.S. Cl. 137—119    6 Claims

ABSTRACT OF THE DISCLOSURE

An irrigation system including a main pipe and at least one branch connected thereto at a junction, a meter in the branch for measuring the volume of water passing therein, at least one outlet on the branch for dispensing water in the area adjacent thereto, a main valve in the pipe downstream of the junction, a branch valve in the branch between the junction and the outlet and means actuated by water flowing in the branch to cause the main valve to open and simultaneously the branch valve to close.

CROSS REFERENCE TO RELATED APPLICATION

This application is a continuation-in-part of application Ser. No. 744,781, filed July 15, 1968 and now abandoned.

The present invention is directed to a control system for irrigation, more specifically to a means for serially actuating branch lines running off of a main supply pipe.

Most irrigation systems have a very large area of ground. They require numerous supply heads for dispensing water and as a result it is not feasible to have all of these supply heads operating at the same time. Under most systems the water pressure would be insufficient to sustain such a load.

It is therefore provided that a series of branch lines, each containing a comparatively small number of supply outlets, is connected to the main line. The problem then arises of actuating the appropriate valves so as to open one of the branch lines at a time over the entire irrigated area. It will be appreciated that the area being large, the various branches may be as much as a mile or more from one another.

It is, therefore, among the objects of this invention to provide an irrigation control system whereby a series of branches may be serially activated so that any one operates at a given time.

It is also among the objects of this invention to provide a control means which is independent of variations in water pressure and rate of flow.

It is further among the objects of this invention to provide an irrigation control system which meters a preset amount of water into each branch before closing it off and permitting the water to flow to the next branch.

Referring to the drawings, constituting a part hereof, and in which like reference characters indicate like parts:

Figure 1:
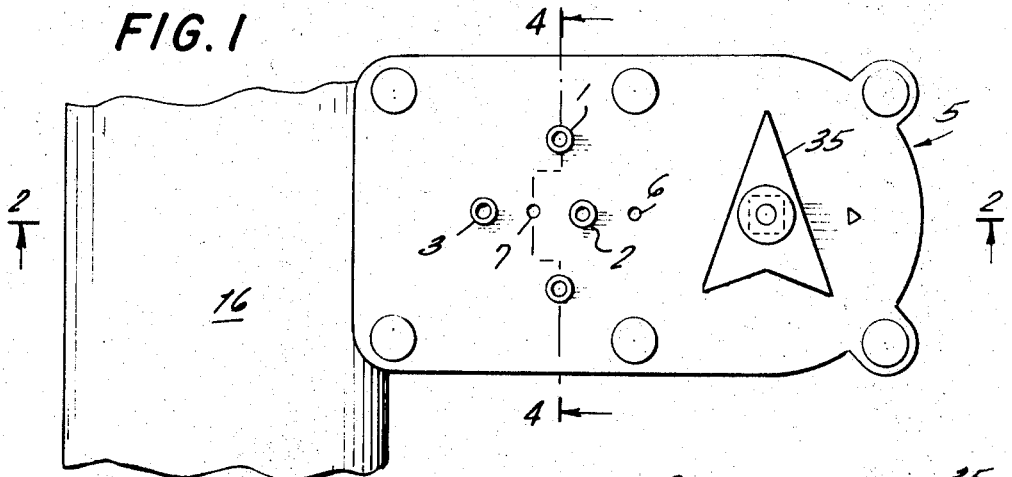
FIG. 1 is a plan view of the exterior of the adjustable meter in accordance with the present invention.
Figure 2:
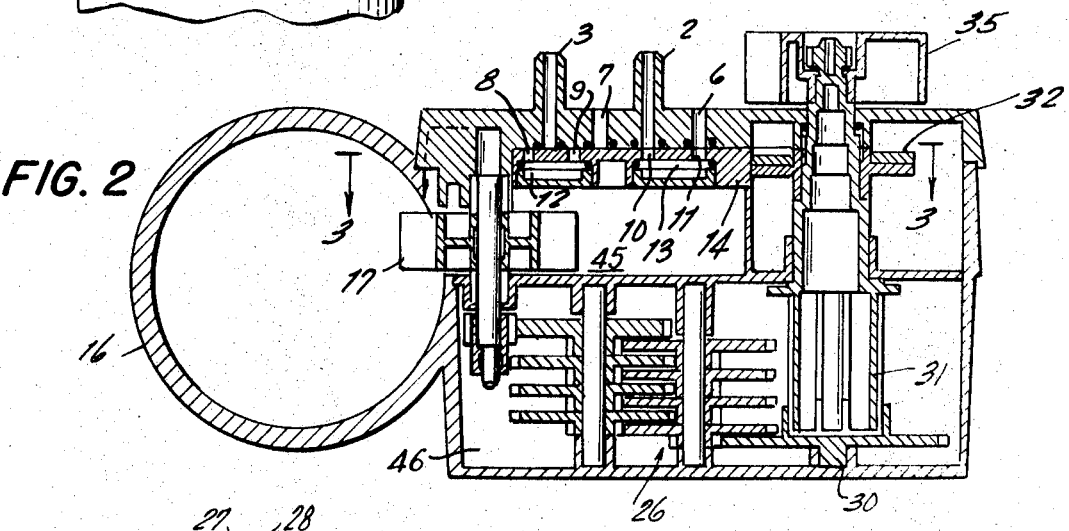
FIG. 2 is a cross-section along line 2—2 of FIG. 1.
Figure 3:
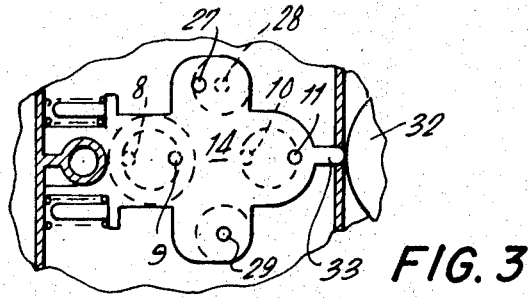
FIG. 3 is a cross-sectional view along line 3—3 of FIG. 2.
Figure 4:
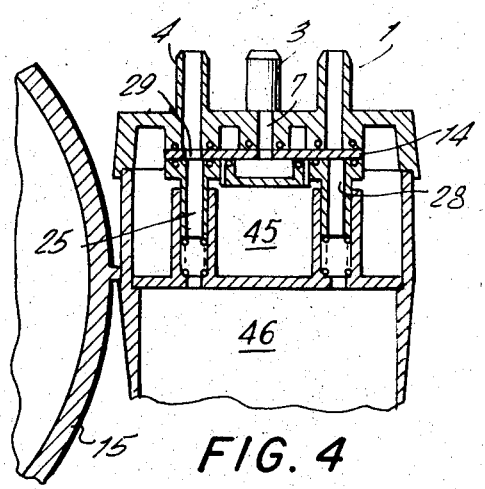
FIG. 4 is a cross-section along line 4—4 of FIG. 1.

There is provided a main pipe 15 joined by branch 16 at substantially right angles thereto. Mounted in main pipe 15 is main valve 23 on the downstream side of the junction between pipe 15 and branch 16. Branch valve 24 is mounted in branch 16 between its junction with pipe 15 and the dispensing outlets.

In the preferred form of the invention valves 23 and 24 are actuated by rack 36 which is mounted for reciprocal motion under the urging of hydraulic cylinder 22. One end of rack 36 is connected to ram 34 which slides within cylinder 22.

There is provided in cylinder 22 a first water inlet 39, a first vent 40, a second water inlet 41 and a second vent 42.

Inlet 39 is connected to water line 4 by means of near end water line 21. Similarly, first vent 40 is connected to vent tube 3 by near end vent 20. At the other end of cylinder 22 second water inlet 41 is connected to water line 1 through far end water line 18, and second vent 42 is connected to vent tube 2 by far end vent 19.

Figure 6:
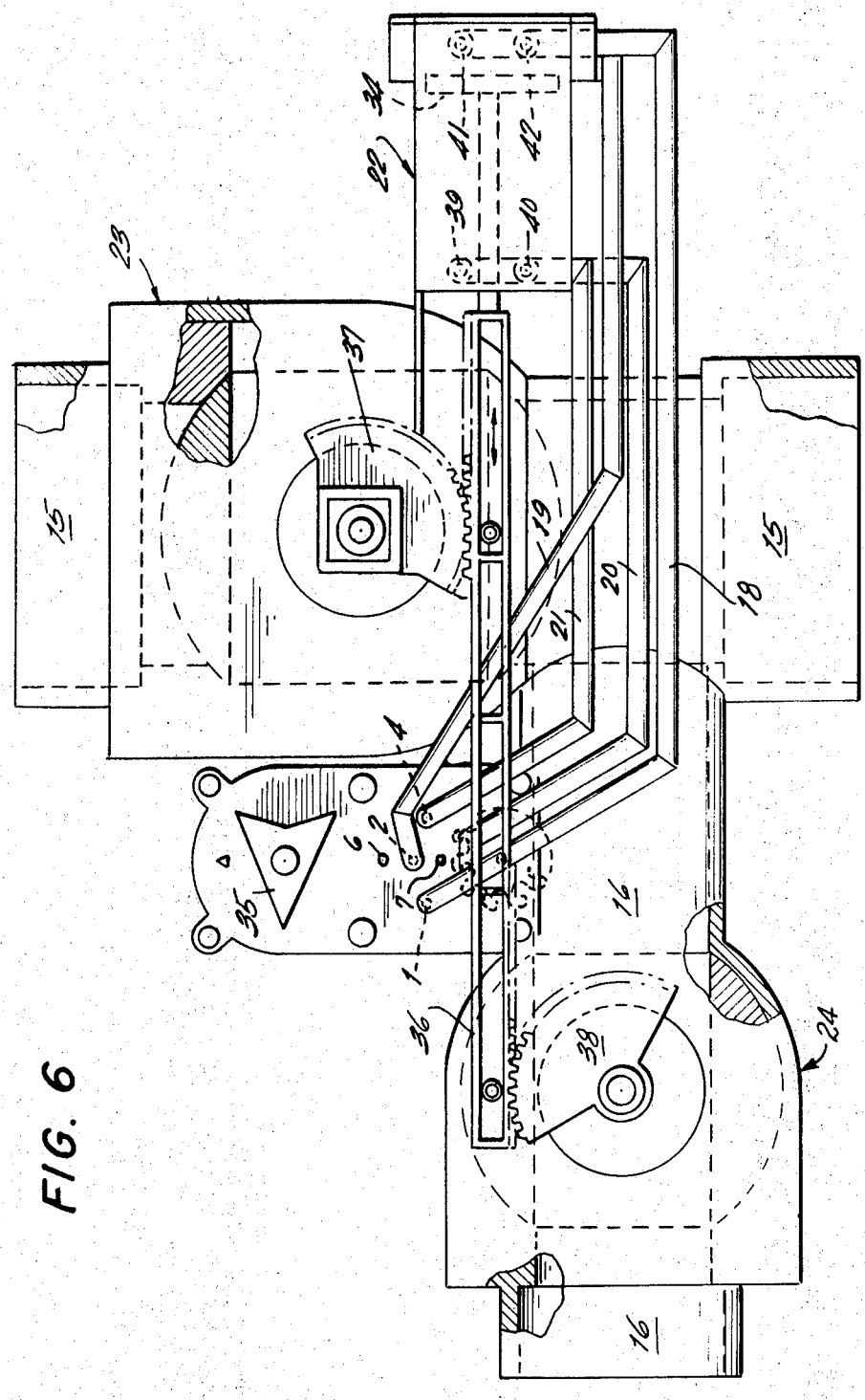
FIG. 6 is a schematic view of the entire mechanism.

From this it can be seen that if water is permitted to flow from water line 1 through far end water line 18 into second water inlet 41 while at the same time first vent 40 is open to atmosphere, ram 34 will move to the left as shown in FIG. 6. As this happens, rack 36 moves in the same direction causing rotation of main sector gear 37 and branch sector gear 38. This in turn causes main valve 23 to open and branch valve 24 to close.

The operation of cylinder 22 (and hence valves 23 and 24) is controlled by the device shown in FIGS. 1-5. The meter and actuating means 5 consists of a measuring device and a control device. The measuring device comprises wheel 17 mounted for rotation about an axis perpendicular to branch 16. Wheel 17 projects at least partially into branch 16 so that water flowing therethrough causes it to rotate about said axis. Wheel 17 also projects partially into chamber 45. Water fills chamber 45 and the entire chamber 46 which houses gear reduction means 26 to supply the water under pressure for actuating the ram 34. Gear reduction means 26 connects wheel 17 with base member 30.

Base member 30 is mounted in meter 5 for rotation about its axis. Member 30 carries clutch means 31 as well as cam 32. Indicator and control 35 are mounted on the upper end thereof. As indicator 35 is turned cam 32 as well as clutch 31 move with it, but due to the action of clutch 31, base member 30 remains stationary. As water flows through branch 16 it actuates wheel 17 which, in turn, causes base member 30, clutch 31 and cam 32 to rotate about the axis.

Water lines 1 and 4 project from meter 5 as do vent tubes 2 and 3. Immediately beneath the upper surface meter 5 is sliding plate 14 carrying cam follower. Plate 14 is adapted for reciprocal motion under the influence of cam 32 and is provided a first passage 8, a first channel 9, a second passage 10 and a second channel 11. These elements are so arranged that in one position of plate 14 communication is had from vent tube 2 through second chamber 13 to second channel 11 to first atmosphere conduit 6. In another position of plate 14, a passage is formed from second vent tube 3 through first passage 8 into first chamber 12 through first channel 9 and out of second atmosphere conduit 7.

Figure 5:
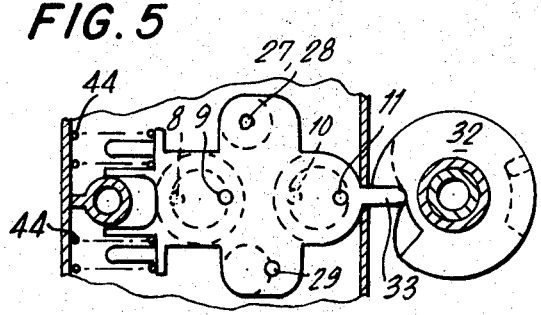
FIG. 5 is a view similar to that of FIG. 3, wherein the control means is in position to close the branch valve.

To supply water line 4 there is provided a first water conduit 25 and water flows from chamber 46 through this conduit through second water hole 29 and into second water line 4. Water line 1 is similarly supplied by second water conduit 28 and the water flows from chamber 46 through said second conduit and plate 14 to first water line 1. When plate 14 is in the position shown in FIGS. 3 and 4, water line 4 and first vent tube 2 are open while the remaining two passages are closed. When plate 14 is in the position shown in FIG. 5, the reverse is true. As can be seen in FIG. 5, first water hole 27 is in register with second water conduit 28 thereby permitting flow therethrough. Thus, depending upon the position of plate 14, cylinder 22 can be actuated to either move ram 34 from right to left (as shown in FIG. 6) or in the opposite direction.

Thus, the system in general operates as follows: At the outset main valve 23 is closed and branch valve 24 is open. This forces the water flowing in main pipe 15 to enter branch 16. In doing so, it actuates wheel 17 which causes rotation of base member 30. This rotation is directly measured by the volume of water passing through branch 16. As base member 30 rotates, it carries with it cam 32. This cam (as can most clearly be seen in FIG. 5) determines the position of plate 14. When the amount of water pre-set has flowed through branch 16, cam 32 will assume the position shown in FIG. 5. Cam follower 33 will then enter the "notch" of cam 32 and plate 14 under the urging of a pair of springs 44 will move from left to right as shown in that figure. This motion permits water to flow through second water inlet 41 on the far side of ram 34. At the same time first vent 40 is opened. This permits ram 34 to move from the far end of cylinder 22 to the near end thereof.

Rack 36 is moved in the same direction causing sector gears 37 and 38 to rotate, thus simultaneously opening valve 23 and closing valve 24. No more water will flow into branch 16 since valve 24 is closed. Since valve 23 is open, the water will flow on to the next branch where the same arrangement of valves, etc., is provided. The system then duplicates the action to the second branch, and so on, for an unlimited number of branches.

To reopen branch valve 24 and reclose main valve 23, it is only necessary to physically rotate control 35 by any desired amount to preselect the amount of water that will flow through branch pipe 16 before the branch valve is again closed in the manner heretofore described. Physical rotation of control 35 effects a rotation of cam 32 independently of base member 30 as a result of slippage of clutch means 31. As cam 32 is rotated, cam follower 33 again rides on the high surface of the cam driving sliding plate 14 to the left against the action of springs 44 from the position shown in FIG. 5 to the position shown in FIG. 3. In the FIG. 3 position, water will flow from chamber 46 through the first water inlet 39 on the near side of the ram 34 and, at the same time, second vent 42 is opened thereby permitting the ram 34 to move from the near end of cylinder 22 to the far end thereof and move rack 36 in the same direction causing sector gears 37 and 38 to rotate thus simultaneously closing valve 23 and opening valve 24. Thus, on the physical setting of control 35, the pressure of the water changes the positions of the valves and permits water to flow in the branch pipe and be monitored by wheel 17 until shut off of the branch pipe is effected by wheel 17, as described hereinabove.

Figure 7:
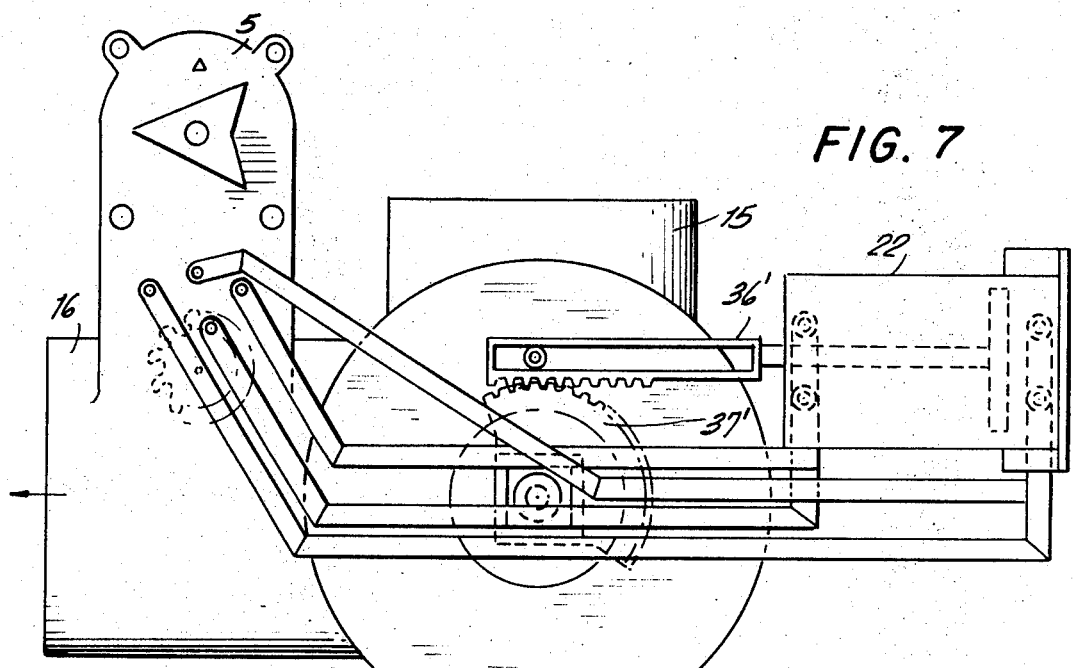
FIG. 7 is a schematic view of a second embodiment of the invention.
Figure 8:
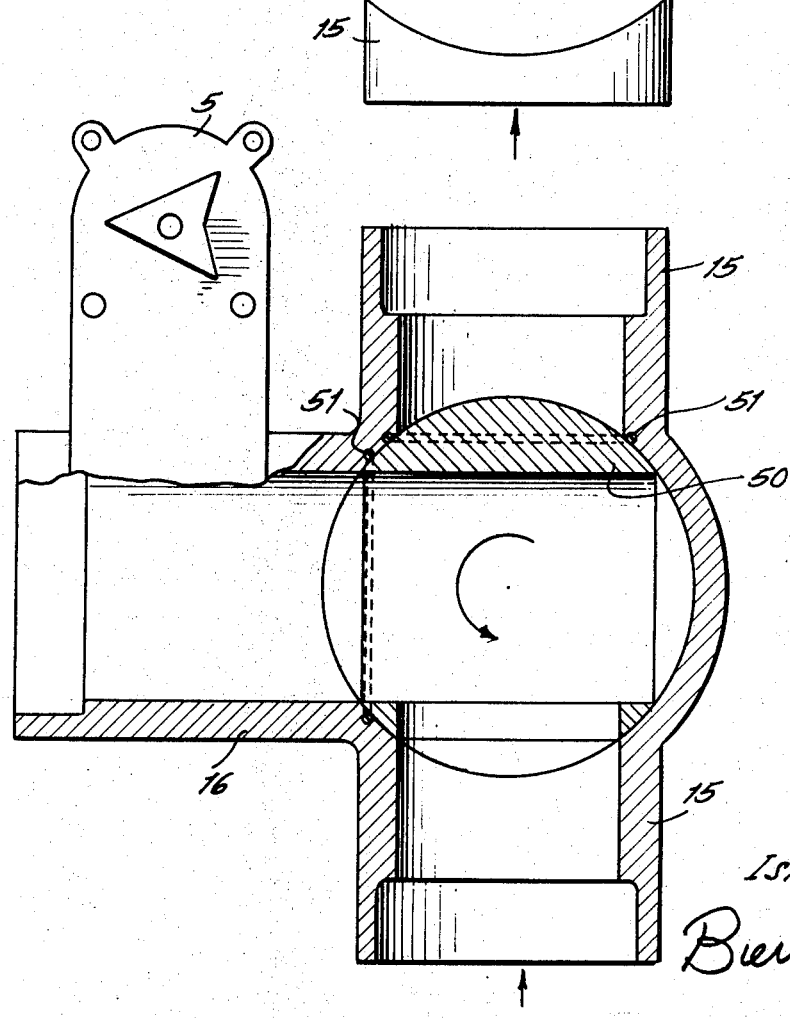
FIG. 8 is a schematic horizontal cross-section of FIG. 7.

FIGS. 7 and 8 show schematically the operation of the system having only one valve 50, which in this case is a ball valve, and which is located in the center of the junction between main pipe 15 and branch pipe 16. As shown in FIG. 8, the part of pipe 15 downstream of the junction is closed, while branch pipe 16 is open, O-rings 51 providing a suitable seal. A sector gear 37' (FIG. 7) is mounted on valve 50 and is actuated by rack 36' moved by hydraulic cylinder 22. The operation of the cylinder 22 is effected with the same meter and actuating means 5 mounted in branch 16 as described with reference to FIGS. 1–5 and does therefore not require further explanation. Ball valve 50 may be replaced by any other suitable type of valve.

The system will operate regardless of the distance between the branches and can be adjusted so that the amount of water distributed from each branch differs from that distributed from any other branch.

While only two specific embodiments of this invention have been expressly described, nonetheless modifications thereof will suggest themselves to those having reasonable skill in the art. The invention is therefore to be broadly construed and is not to be limited except by the character of the claims appended hereto.

What is claimed is:

1. An irrigation system comprising a main pipe adapted to carry water therethrough, at least one branch pipe connected to said main pipe at a junction, valve means associated with said pipes at said junction for controlling the flow of water in each of said pipes, and actuating means controlling said valve means for closing said branch pipe while concurrently opening said main pipe and for opening said branch pipes while concurrently closing said main pipe, said actuating means including a prime mover operable in opposite directions, a chamber for receiving water under pressure at said junction, a first delivery line connected between said chamber and said prime mover for operating said prime mover in one direction, a second delivery line connected between said chamber and said prime mover for operating said prime mover in an opposite direction, a controlling valve for opening the connection of one of said first and second delivery lines to said prime mover while closing the connection of the other of said first and second delivery lines to said prime mover and valve operating means for operating said controlling valve, said valve operating means including impeller means actuated by the water flowing in said branch pipe.

2. An irrigation system as claimed in claim 1 wherein said actuating means further includes venting means for venting said prime mover, a first vent line connected between said venting means and said prime mover and a second vent line connected between said venting means and said prime mover, said controlling valve including vent line controlling means for opening the connection of one of said second and first vent lines to said prime mover while closing the connection of the other of said second and first vent lines to said prime mover.

3. An irrigation system as claimed in claim 1 wherein said valve operating means includes a rotatable cam operated by said impeller means and said controlling valve includes a sliding plate and spring means for biasing said plate into engagement with said cam.

4. An irrigation system as claimed in claim 3 wherein said valve operating means includes a control member connected to said cam for effecting manual rotation of said cam and clutch means interposed between said cam and said impeller means whereby to permit rotation of said cam independent of said impeller means.

5. An irrigation system as claimed in claim 1 wherein said valve means includes a ball valve.

6. An irrigation system comprising a main pipe adapted to carry water therethrough, at least one branch connected to said pipe at a junction, at least one outlet on said branch adapted to dispense water in the area adjacent said outlet, valve means in said pipe at said junction, means actuated by said water to cause said valve means to open said main pipe and simultaneously close said branch, said valve means comprising a main valve in said pipe downstream of said junction and a branch valve in said branch between said junction and said outlet, said means actuated by said water causing said main valve to open and simultaneously said branch valve to close, said means actuated by said water including a meter in said branch adapted to measure the volume of water passing into said branch, and comprising an impeller mounted for rotation about an axis, at least a portion of said impeller projecting into said branch and adapted to rotate under the pressure of water flowing through said branch, a base member mounted for rotation parallel to said axis, a reduction gear train between said impeller and said base member, a cam mounted coaxially with said base member and rotatable therewith, a sliding plate in said meter, a cam follower on said sliding plate and bearing against said cam, spring means urging said cam follower against said cam, a branch sector gear on said branch valve, a main sector gear on said main valve, whereby rotation of said gears causes said valves to open and close, a rack in engagement with both of said sector gears, a hydraulic cylinder having a near end and a far end mounted adjacent one end of said rack and having an axis parallel thereto, a ram in said cylinder connected to said one end and adapted for reciprocal motion within said cylinder under the influence of hydraulic fluid, a first water inlet and vent at said near end, a second water inlet and vent at said far end, water lines between said inlets and said meter, vent tubes between said vents and said meter, said plate having water holes corresponding to said lines and having vent openings corresponding to said tubes, said holes and said openings being so located on said plate that in one position thereof said line to said near end and said tube from said far end are open and the other of each of said holes and said openings are closed, and in another position said line to said far end and said vent from said near end are open and the others of each of said holes and openings are closed, each of said holes being connected to a supply of water and each of said openings being connected to atmosphere when open, said cam causing reciprocation of said plate, whereby said rack is moved axially to open said main valve and close said bracket valve simultaneously.

References Cited

UNITED STATES PATENTS

| | | | |
|---|---|---|---|
| 1,018,925 | 2/1912 | Pruden | 137—119 |
| 1,859,357 | 5/1932 | Elder | 137—119 |
| 2,642,076 | 6/1953 | Tigert et al. | 137—119 |
| 3,108,609 | 10/1963 | Schroder | 137—119 |
| 3,145,736 | 8/1964 | Gheen | 137—624.13 |

WILLIAM G. O'DEA, Primary Examiner

D. J. ZOBKIW, Assistant Examiner

U.S. Cl. X.R.

137—624.13, 625.11; 239—66, 68; 251—304